United States Patent
Ead et al.

(10) Patent No.: US 7,252,046 B1
(45) Date of Patent: Aug. 7, 2007

(54) APPARATUS FOR DEPLOYING AND RECOVERING A TOWED ACOUSTIC LINE ARRAY FROM AN UNMANNED UNDERSEA VEHICLE

(75) Inventors: Richard M. Ead, Wakefield, RI (US); Robert L. Pendleton, Portsmouth, RI (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 674 days.

(21) Appl. No.: 10/730,341

(22) Filed: Dec. 8, 2003

(51) Int. Cl.
*B63B 21/16* (2006.01)
(52) U.S. Cl. ...................................................... 114/254
(58) Field of Classification Search ........................ None
See application file for complete search history.

(56) References Cited

U.S. PATENT DOCUMENTS

| | | | | |
|---|---|---|---|---|
| 2,404,266 A | * | 7/1946 | Loughnane | 114/254 |
| 3,961,589 A | * | 6/1976 | Lombardi | 114/254 |
| 5,119,751 A | * | 6/1992 | Wood | 114/242 |
| 5,263,431 A | * | 11/1993 | Wood | 114/254 |
| 5,745,436 A | | 4/1998 | Bittleston | |
| 5,757,724 A | | 5/1998 | Wilson et al. | |
| 5,757,725 A | | 5/1998 | Wilson et al. | |
| 5,967,076 A | | 10/1999 | Tinnen | |
| 6,052,332 A | | 4/2000 | Obara | |
| 6,058,072 A | | 5/2000 | Abraham | |
| 6,111,817 A | | 8/2000 | Teeter | |
| 6,227,866 B1 | | 5/2001 | Williams et al. | |
| 6,253,700 B1 | * | 7/2001 | Gorlov | 114/242 |
| 6,269,763 B1 | | 8/2001 | Woodland | |
| 6,305,309 B1 | | 10/2001 | Ead et al. | |
| 6,350,085 B1 | | 2/2002 | Bath et al. | |
| 6,606,958 B1 | * | 8/2003 | Bouyoucos | 114/242 |
| 2002/0015359 A1 | | 2/2002 | Joh et al. | |

* cited by examiner

*Primary Examiner*—Lars A. Olson
(74) *Attorney, Agent, or Firm*—James M. Kasischke; Jean-Paul A. Nasser; Michael P. Stanley

(57) ABSTRACT

A free flooded section of an unmanned undersea vehicle (UUV) contains a rotating cylindrical drum, which serves as a spool for a towed line array cable. At the end of the cable is a reverse thruster with the ability to propel itself away from the UUV when the UUV is submerged. The thruster moves away from the UUV, pulling the cable and unspooling it as it does so in order to deploy the array. To recover the array, the cylindrical drum rotates to reel in the cable. The cable is guided through a series of winding guides that allow the cable to be wound evenly on the drum.

7 Claims, 6 Drawing Sheets

APPARATUS FOR DEPLOYING AND RECOVERING A TOWED ACOUSTIC LINE ARRAY FROM AN UNMANNED UNDERSEA VEHICLE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER RELATED APPLICATIONS

Not applicable.

BACKGROUND OF THE INVENTION (1) Field of the Invention

The present invention relates in general to towed array devices, and more specifically to an apparatus that deploys and recovers a towed acoustic sensor line array from an unmanned undersea vehicle.

(2) Description of the Prior Art

Towed acoustic sensor line arrays are used in military and civilian applications to detect acoustic signals in the water. For instance undersea vehicles use such arrays to establish or supplement their sonar capabilities. Traditional towed acoustic sensor arrays take the form of linear arrays of hydrophones mounted inside a flexible hose, the array being connected to a towing vessel by a tow cable.

Unmanned undersea vehicles, (UUVs) are subject to certain constraints in their use of towed arrays particularly where the towed array is of significant length (ranging from 100 to 300 feet). Where a UUV is launched from or recovered by a larger undersea vehicle such as a submarine, the array cannot be already deployed without the risk of tangling or damaging the cable or creating additional drag on the UUV. Under these circumstances, what is needed is an apparatus for deploying a towed array from a UUV after the UUV is launched and then recovering the towed array before the UUV itself is recovered.

SUMMARY OF THE INVENTION

It is a general purpose and object of the present invention to provide apparatus that allows a UUV to deploy and recover a towed array of significant length.

It is a further object to allow the UUV to deploy the array while the UUV is stationary or moving at a low speed.

These objects are accomplished with the present invention by having a free flooded section of the UUV that contains a cylindrical rotating drum for spooling the line array tow cable. The rotating drum can either spool out or reel in the cable. At the end of the cable is a reverse thruster that has the ability to propel itself away from the UUV pulling the cable out as it does so in order to deploy the cable. To recover the cable the drum rotates and the cable is reeled in, passing through a series of winding guides to insure that the cable does not entangle and is wrapped evenly on the drum.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
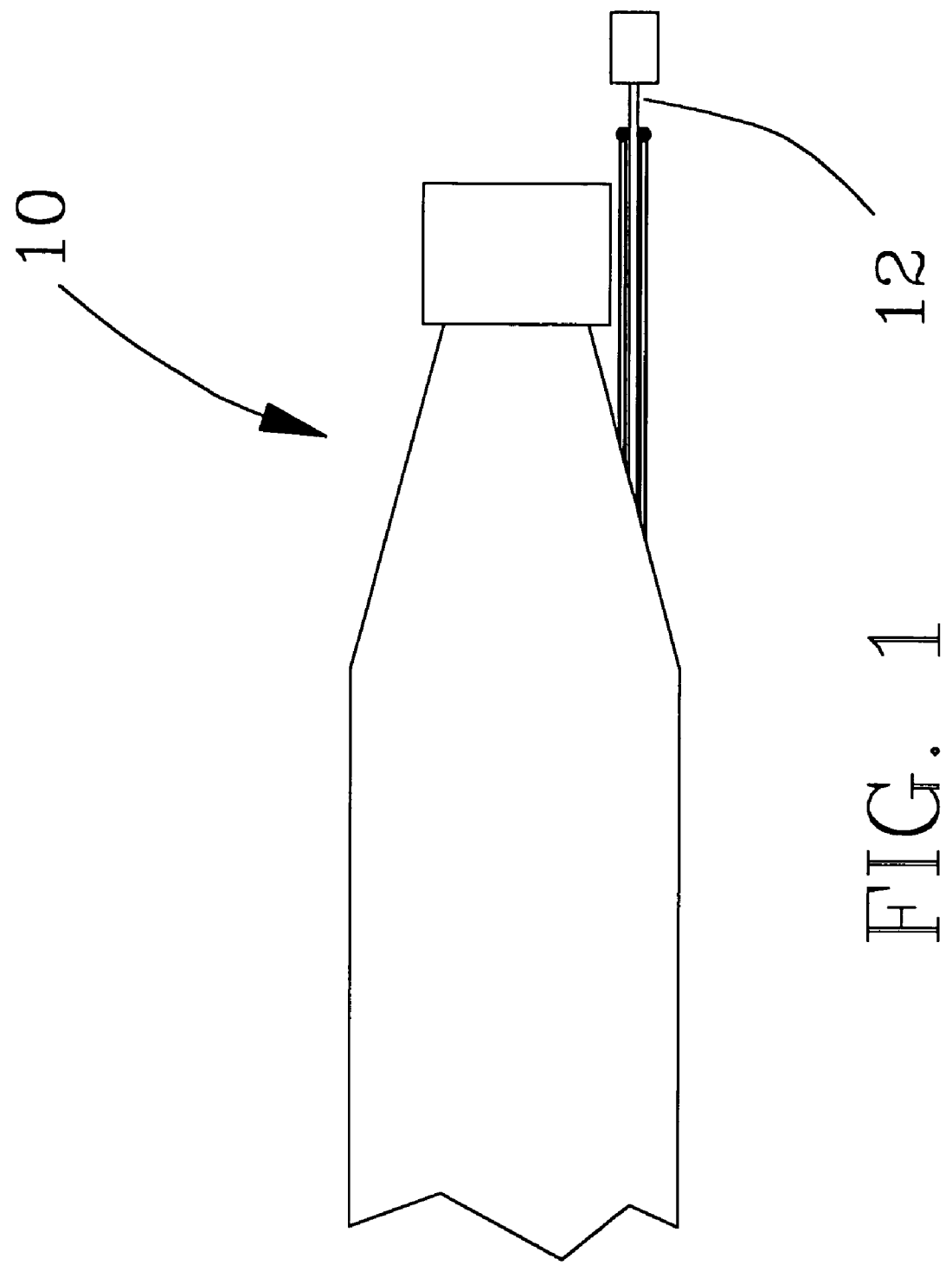
FIG. 1 shows the present invention with the array in the recovered position.
Figure 2:
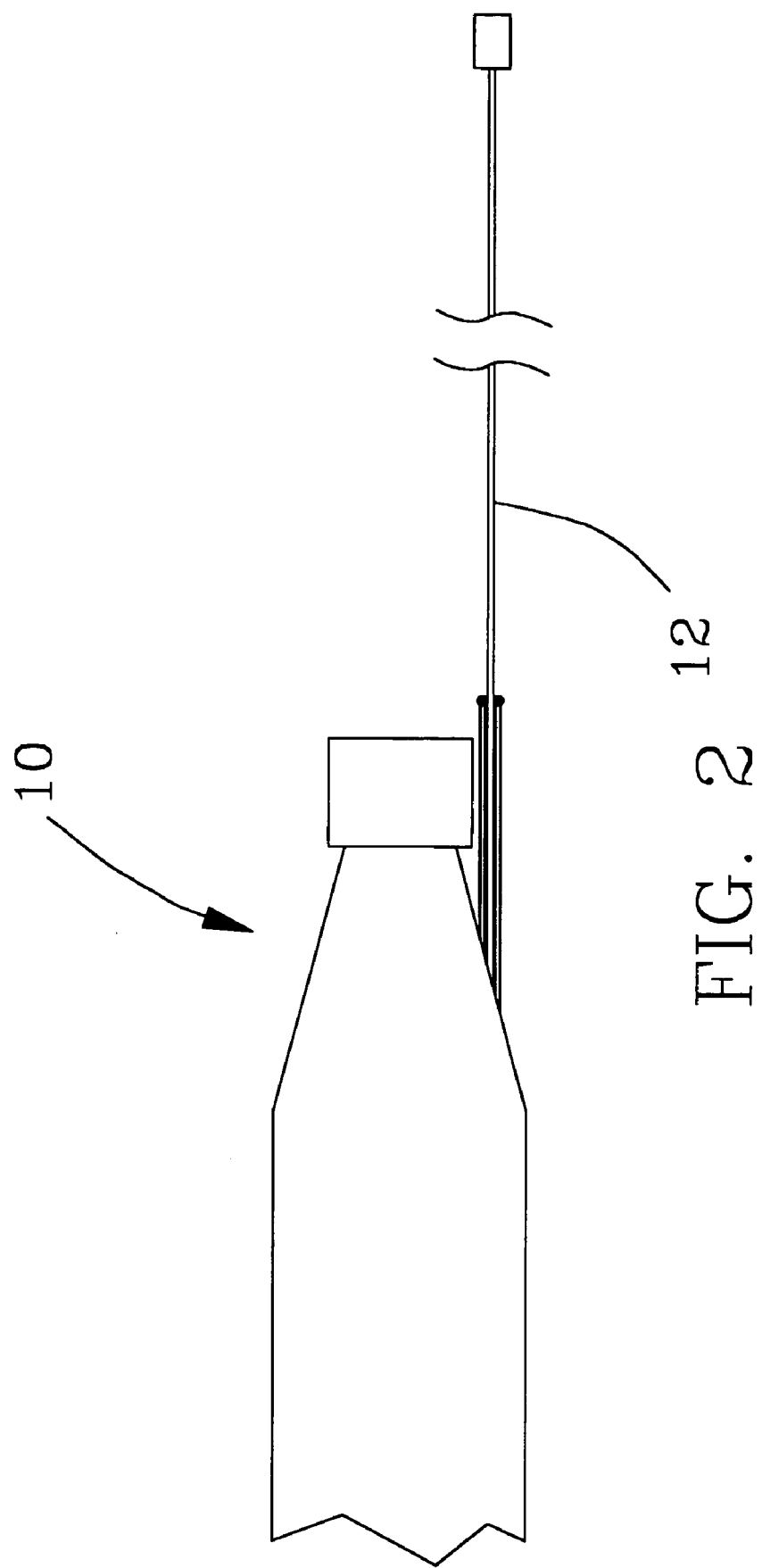
FIG. 2 shows the present invention with the array in the deployed position.

Referring now to FIG. 1, there is shown a UUV 10. Located in the aft section of the UUV 10 is a towed line array 12, which is essentially a flexible cable. The towed array 12 is in the recovered position completely retracted within the UUV 10. Referring now to FIG. 2 there is shown the UUV 10 with the towed array 12 in the deployed position.

Figure 3:
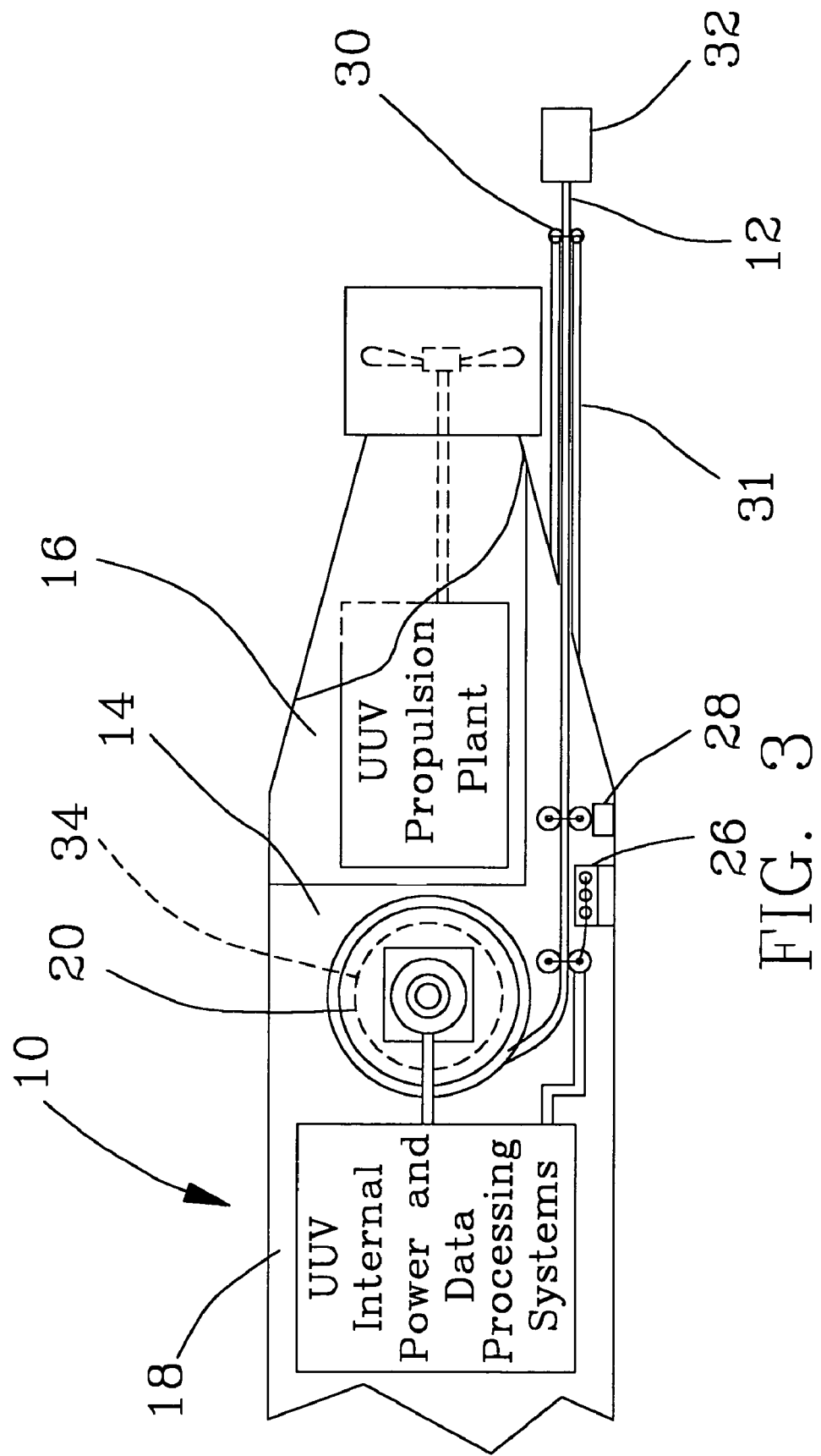
FIG. 3 shows a cut away view of the present invention from the port side of the UUV.

Referring now to FIG. 3, there is shown a view from the port side of the UUV 10 with a cut away section revealing the towed array deployment and retrieval apparatus. In a preferred embodiment, the apparatus resides in a free flooded section 14 of the UUV 10, between the UUV propulsion compartment 16 and the UUV internal power and data processing systems compartment 18. A cylindrical drum 20 is used as a spool upon which to wind and unwind the array 12. Mounted to drum 20 is electronics assembly 22 and commutator assembly 24. Electronics assembly 22 is primarily used for converting data that is generated by the various acoustic hydrophones in the array 12 into a serial format for passing the data across the commutator assembly 24. The commutator assembly 24 is used for transferring power and data between the array 12 and the UUV internal power and data processing systems 18. The array 12 passes from the drum 20 through a mechanical or electrical winding guide 26. Winding guide 26 moves with a sideways motion that is synchronized with the rotation of drum 20 such that array 12 is retrieved and wound on the drum 20 in consecutive smooth layers. Winding guide 26 has a tension sensor 27 (See FIG. 4) that automatically adjusts power to a drive motor 34 (shown by hidden lines) that turns drum 20 to maintain a constant tension during deployment. There are two stationary winding guides 28 and 30. They are essentially rollers through which array 12 passes through. Stationary winding guide 28 is located within the free flooded section 14. Stationary winding guide 30 is located at the end of deployment guide 31. Deployment guide 31 protrudes from the exterior of the UUV 10 and serves as a barrier to prevent the cable from tangling with the UUV 10.

At the very end of the array 12 is a reverse thruster 32. The function of reverse thruster 32 is to help deploy the line array 12 during missions requiring the UUV 10 to "hover" or when the UUV 10 is traveling at low speeds. At higher speeds, the thruster 32 is not operative and serves as a drogue to assist in array 12 deployment. The thruster 32 is not operative during recovery of the array 12.

Figure 4:
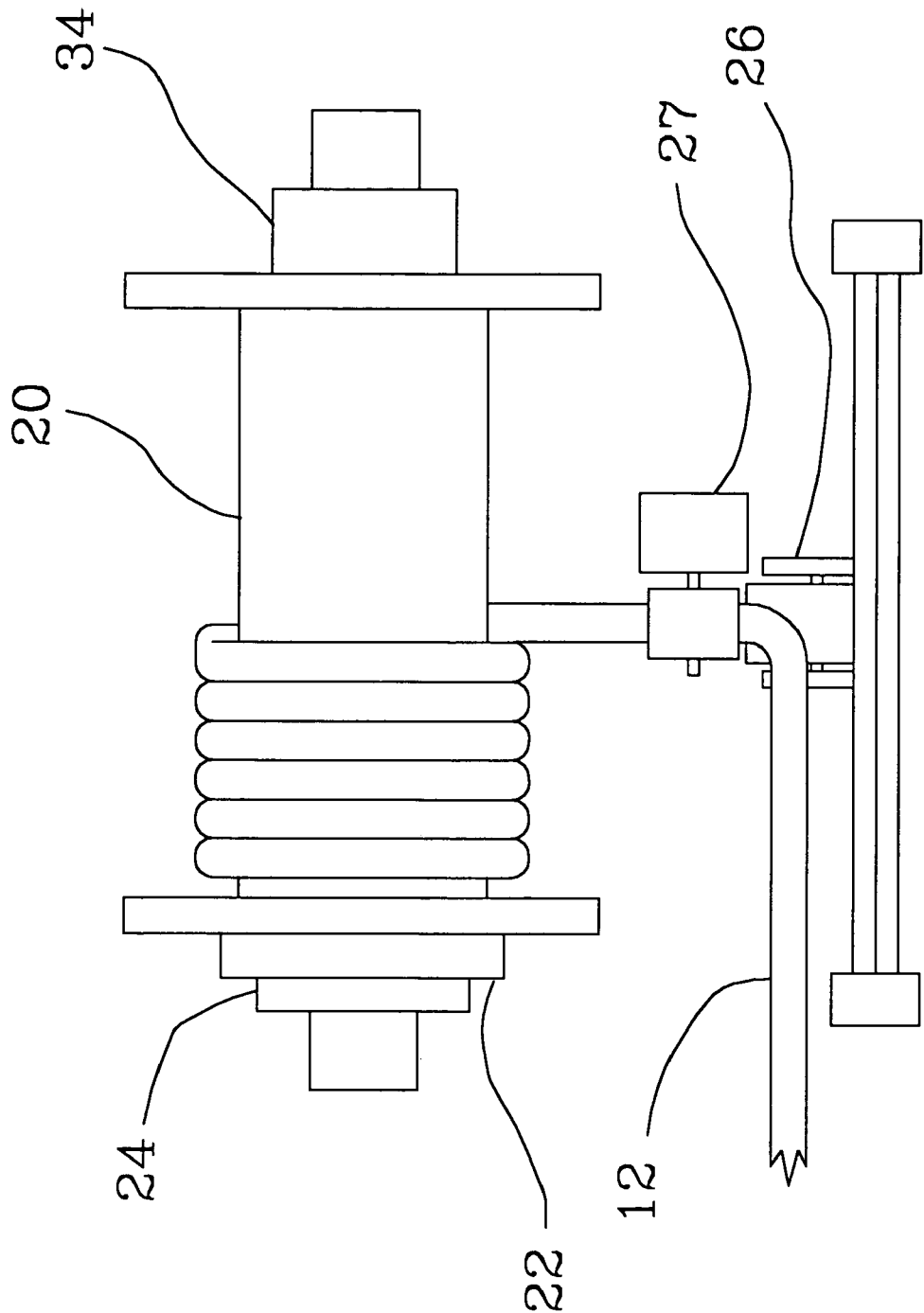
FIG. 4 shows a view of the drum assembly from the back end of the UUV.

The drive motor 34 shown by hidden lines in FIG. 3 can be an electric motor powered by the UUV internal power source. FIG. 4 shows a forward view of the entire drum assembly as seen from the back end of the UUV 10. On one end of the drum 20 is the electronics assembly 22 and commutator assembly 24 and on the other end is the drive motor 34. Winding guide 26 is beneath drum 20 and traverses back and forth along the length of drum 20. Joined to winding guide 26 is tension sensor 27.

Figure 5:
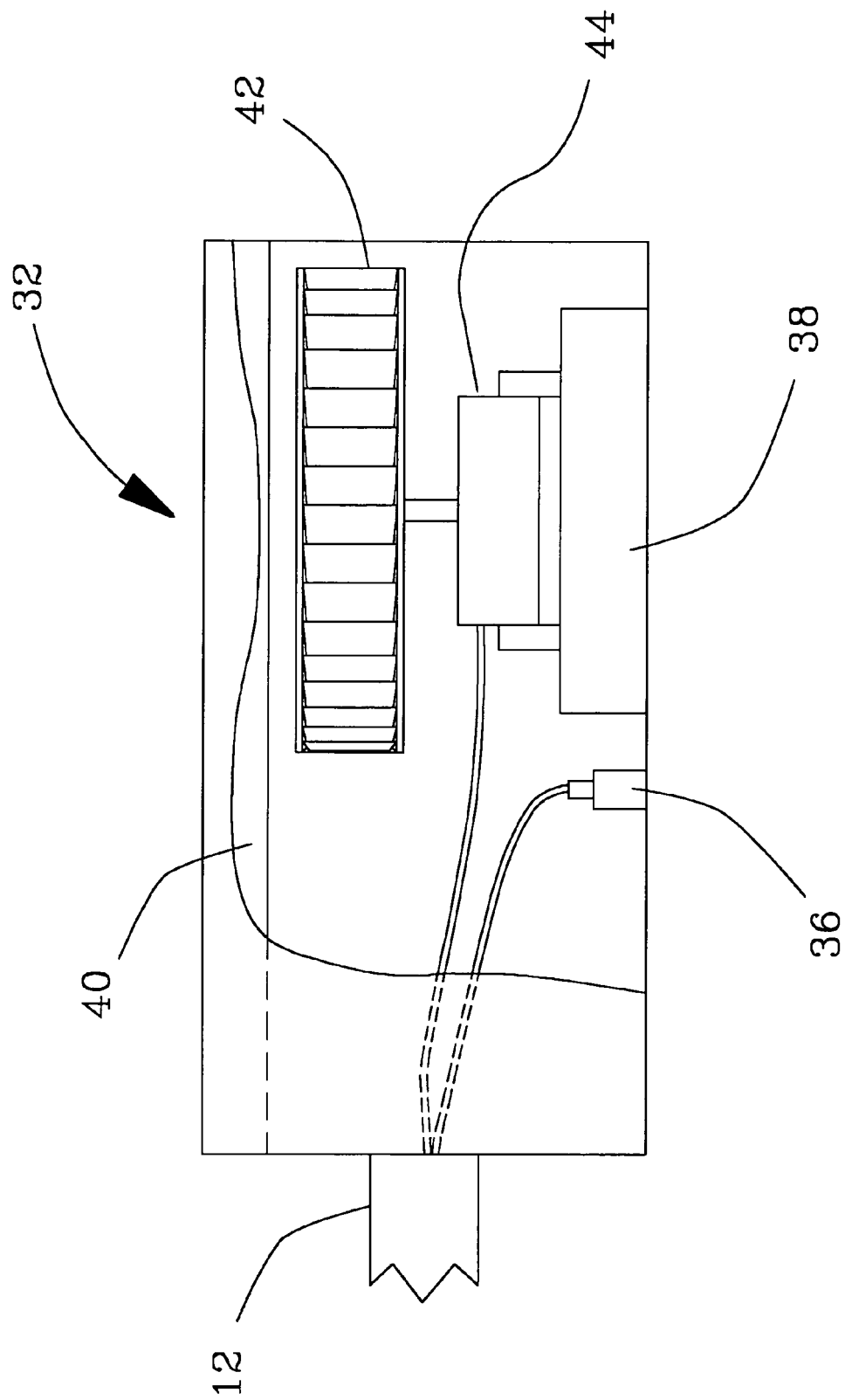
FIG. 5 shows a cut away view of the reverse thruster.
Figure 6:
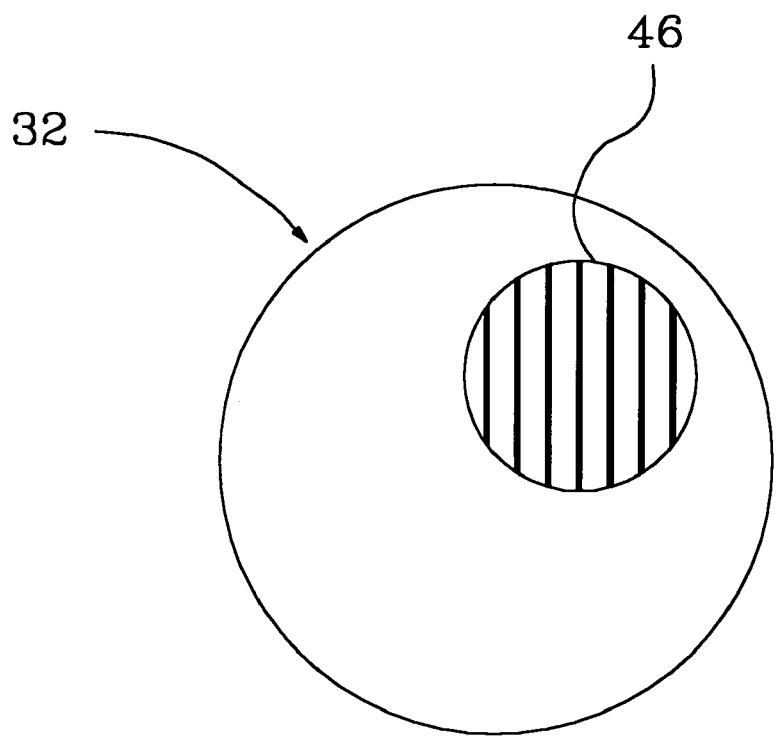
FIG. 6 shows an aft view of the reverse thruster featuring the water inlet port.
Figure 7:
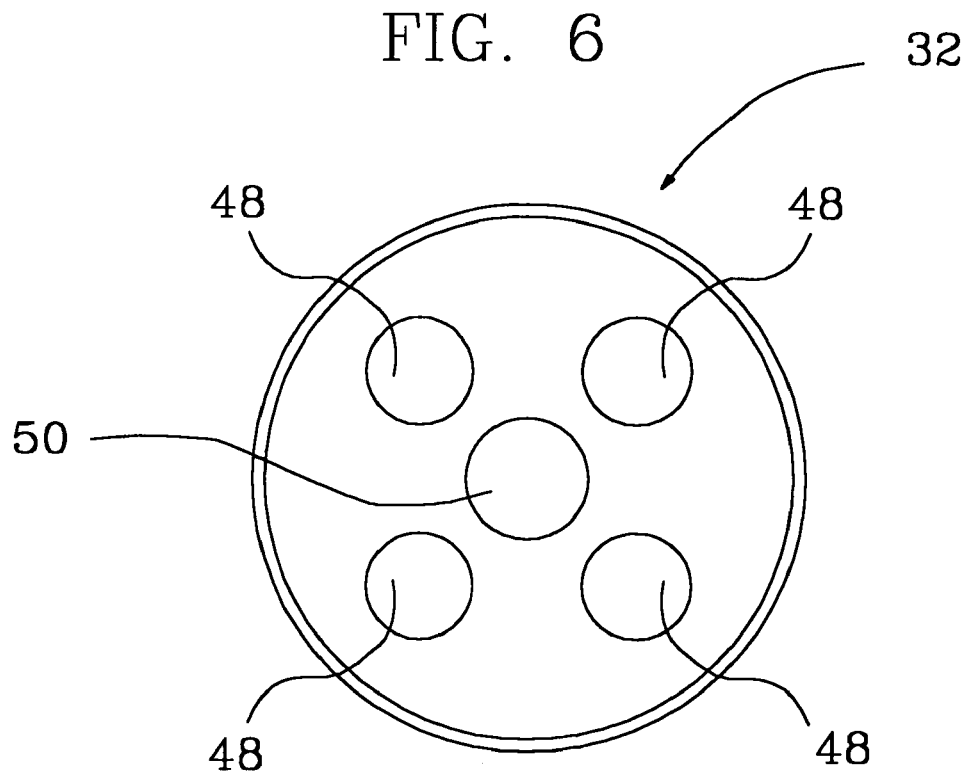
FIG. 7 shows a forward view of the reverse thruster featuring the water exit ports and tow cable connection.

Referring now to FIG. 5, there is shown a side view with a cut away section of the reverse thruster 32. A depth sensor 36 that sends a signal to the UUV 10 via towed array 12 can be provided within thruster 32. There is a counterweight 38 to help correct for any roll that the reverse thruster 32 may experience. There is a buoyancy air chamber 40 to help the thruster 32 to remain buoyant. The thruster should be as neutrally buoyant as possible. The combination of the buoyant air chamber 40 and counterweight 38 helps to prevent twisting of the array 12. The reverse thruster is able to generate thrust though a spinning paddle wheel 42 which is spun by an electric motor 44. The paddle wheel 42 creates water flow with a resultant force in the opposite direction of the water flow. FIGS. 6 and 7 show aft and forward views respectively of the thruster 32. The water inlet port 46 allows water to flow into the thruster 32. Once the water has flowed inside the thruster 32, the spinning paddle wheel 42 forces the water out of the thruster 32 through one of the multiple water exit ports 48. The tow cable connection 50 is also illustrated in the forward view of the thruster 32 in FIG. 7.

The advantages of the present invention over the prior art are that through the use of the array deployment and recovery apparatus, an unmanned undersea vehicle equipped with a towed array of significant length (ranging from 100 to 300 feet) can now be launched from inside of or outside of another larger undersea vehicle through a variety of methods. There will also be minimal drag on the unmanned undersea vehicle with the array in its non-deployed (recovered) position as the UUV "swims out" to its area of operation.

What has thus been described is an apparatus for deploying and recovering a towed acoustic line array from an unmanned undersea vehicle.

Obviously many modifications and variations of the present invention may become apparent in light of the above teachings. For example, the array deployment guide can be located in several other locations instead of the aft section of the UUV. In an alternative embodiment the present invention might include additional thruster capability for three dimensional control for accurately positioning the end of the array. Three dimensional control could be achieved through the use of three internal paddle wheels in the thruster positioned at ninety degree angles from each other. Also, at moderate to high UUV operating speeds the need for a thruster to assist deployment may not be required and it can be substituted with a simple drogue device.

In light of the above, it is therefore understood that within the scope of the appended claims, the invention may be practiced otherwise than as specifically described.

What is claimed is:

1. An apparatus for deploying and recovering a towed line array from a vehicle, comprising:
   a cylindrical drum located inside the vehicle upon which to spool the towed line array;
   an electric motor joined to rotate said cylindrical drum;
   an electro-mechanical winding guide whose movement is synchronized with that of the cylindrical drum for guiding and retaining the towed line array in a slidable manner as the towed line array is wound onto said cylindrical drum;
   a plurality of stationary winding guides internal to the vehicle through which said towed line array is guided; and
   a reverse thruster joined at an end of the towed line array outside the vehicle, said reverse thruster capable of propelling itself away from the vehicle.

2. An apparatus according to claim 1 further comprising a tension sensor capable of measuring the tension of said towed line array and joined to said electric motor such that said tension sensor automatically adjusts power to said electric motor that turns said cylindrical drum to maintain a constant tension on said towed line array during deployment.

3. An apparatus according to claim 1 wherein said reverse thruster further comprises:
   a housing joined to the end of the towed line array having a water inlet port and a water exit port formed therein;
   a paddle wheel positioned in said housing;
   an electric motor in said housing joined to said paddle wheel to generate thrust.

4. An apparatus according to claim 3 wherein said reverse thruster further comprises:
   a buoyant section within said housing; and
   a counterweight in said housing to correct for rolling.

5. An apparatus according to claim 4 wherein said reverse thruster further comprises a depth sensor joined to a control system of the vehicle.

6. An apparatus according to claim 1 wherein said electric motor further comprises a commutator assembly.

7. An apparatus according to claim 1 further comprising a tube external to the vehicle through which said towed line array is guided.

\* \* \* \* \*